United States Patent
Topel et al.

(10) Patent No.: US 12,430,995 B2
(45) Date of Patent: Sep. 30, 2025

(54) SYSTEM FOR NON-LETHAL DEFENSE AND CROWD CONTROL IN PUBLIC AND PRIVATE SPACES

(71) Applicant: Non Lethal Labs LLC, Bethel, CT (US)

(72) Inventors: Spencer Topel, New York, NY (US); Lawrence Lopata, Bethel, CT (US)

(73) Assignee: Non Lethal Labs LLC, Bethel, CT (US)

( * ) Notice: Subject to any disclaimer, the term of this patent is extended or adjusted under 35 U.S.C. 154(b) by 148 days.

(21) Appl. No.: 18/336,923

(22) Filed: Jun. 16, 2023

(65) Prior Publication Data
US 2024/0078880 A1    Mar. 7, 2024

Related U.S. Application Data (60) Provisional application No. 63/366,626, filed on Jun. 18, 2022.

(51) Int. Cl.
| | |
|---|---|
| G08B 3/10 | (2006.01) |
| F41H 13/00 | (2006.01) |
| G06V 20/52 | (2022.01) |
| G08B 5/36 | (2006.01) |
| G08B 21/02 | (2006.01) |
| G08B 31/00 | (2006.01) |
| G10K 13/00 | (2006.01) |
| F41H 9/10 | (2006.01) |
| G08B 15/00 | (2006.01) |
| G08B 15/02 | (2006.01) |

(52) U.S. Cl.
CPC ........... *G08B 3/10* (2013.01); *F41H 13/0081* (2013.01); *G06V 20/52* (2022.01); *G08B 5/36* (2013.01); *G08B 21/0241* (2013.01); *G08B 31/00* (2013.01); *G10K 13/00* (2013.01); *F41H 9/10* (2013.01); *G08B 15/007* (2013.01); *G08B 15/02* (2013.01)

(58) Field of Classification Search
CPC ........ G06V 20/52; G08B 15/00; G08B 31/00; G08B 17/06; G08B 17/10; G08B 25/009; H04M 3/5116
See application file for complete search history.

(56) References Cited

U.S. PATENT DOCUMENTS

| | | | |
|---|---|---|---|
| 10,506,411 B1 * | 12/2019 | Jacob | H04W 4/90 |
| 2016/0093198 A1 * | 3/2016 | Tung | G08B 21/0423 |
| | | | 340/539.11 |
| 2016/0232774 A1 | 8/2016 | Noland et al. | |

(Continued)

OTHER PUBLICATIONS

Blair, J.P., et al.; "Active Shooter Events from 2000 to 2012"; Law Enforcement Bulletin; Jan. 7, 2014; 16 Pages.

(Continued)

*Primary Examiner* — Mirza F Alam
(74) *Attorney, Agent, or Firm* — Whitmyer IP Group LLC (57) ABSTRACT

A non-lethal electronic defense device comprising one or more effects such as light, sonic, ultrasonic, infrasonic, chemical, electrical, or mechanical devices capable of causing intense sensations of disorientation, distress, incapacitation, and/or pain for the purpose of protecting a public or private space from an intruder or attacker exhibiting an intent to cause harm to physical inhabitants or destruction of property therein.

25 Claims, 7 Drawing Sheets

(56) References Cited

U.S. PATENT DOCUMENTS

2016/0284182 A1     9/2016  Havens
2016/0343237 A1*   11/2016  Herman ................ H04W 4/021
2018/0158305 A1*    6/2018  Noland .............. G08B 21/0438

OTHER PUBLICATIONS

International Preliminary Report on Patentability; Application No. PCT/US2023/068639; Issued: Dec. 18, 2024; 11 Pages.

* cited by examiner

SYSTEM FOR NON-LETHAL DEFENSE AND CROWD CONTROL IN PUBLIC AND PRIVATE SPACES

TECHNICAL FIELD

The invention is directed to a system providing non-lethal defensive capabilities causing intense sensations of disorientation, distress, incapacitation, and/or pain for the purpose of protecting a public or private space from an intruder or attacker, and for crowd control.

BACKGROUND

Non-lethal defensive strategies for private or public areas and crowd control have largely been oriented toward strategies that heighten tensions. Police in riot gear, tear gas, rubber bullets and the like can make matters worse and actually may incite violence and property destruction. The rise of mass shootings, political and social unrest, and other threats has increased the need for better defense strategies for these types of incidents. In some cases, these incidents are performed by a lone individual who premeditate plans to attack weakly defended targets such as schools, grocery stores, or churches, using weapons capable of accurately and rapidly firing many rounds of lethal ammunition. In other cases, a large group of individuals incite one another toward acts of violence and property destruction. In either case, high causality numbers and high value property damage can occur in a relatively brief amount of time, and importantly before police or emergency services can arrive.

In most cases where there isn't an armed security presence, residents and occupants must wait for an external response team such as police, SWAT, or security services. The Response Time to Active Shooter Attacks (RTASA) is often the most critical factor in reducing fatalities in a mass murder incident. The average RTASA for most incidents is three minutes, which is comparatively fast by police standards [J. P. Blair et al., "Active Shooter Events from 2000 to 2012", Law Enforcement Bulletin, Jan. 7, 2014, accessed Jul. 7, 2022]. However, often the fastest RTASA fails to stop mass shooting events, since the majority of these events are over before law enforcement arrives. Similarly, mobs generally grow with time and the larger they get the more property damage and other violence they may inflict. The sooner a mob can be dispersed, the less harm they are likely to inflict.

An alternative to police response teams is the deployment of defensive systems on-site and prior to the occurrence of an attack. State-of-the-art defensive systems for buildings and dwellings includes deployment of mechanical systems, such as heavy locking door systems or central control for automating facility-wide lockdown in the case of property, and similar deployment of physical barriers for crowds. A device can also be used to create a mechanical deterrent called a "man trap," or a small passageway with heavy doors or other barriers on either side that can be activated when an attacker or group enters the passageway. This solution, while effective, is not practical on a large-scale deployment level, and also requires some external response team or system to direct the attacker towards this location in the building or dwelling.

Other prior art in this category of home and public space security has largely focused on sensing threats or attacks and alerting emergency services (US20180158305A1, U.S. Ser. No. 10/506,411B1). While these systems can improve response times, they do nothing to slow or inhibit the attack.

The following objects are aimed at decreasing the effectiveness of an intruder or attacker or mob intent on fatal bodily harm on the occupants or high value damage to property of a public or private space, by slowing down, disorienting, and disrupting an unfolding mass casualty/property damage incident.

SUMMARY

To achieve the objects of this invention, the disclosed systems and methods combine intense deterrent physiological and deterrent psychological effects directed at an attacker or crowd through an apparatus or array of apparatuses that perform behavioral feedback with the attacker or crowd in such a way as to increase or exacerbate the physiological and psychological effects.

It is an object of this invention to provide a sensorial device that imposes overwhelming negative sensations through nerves and receptors at low-level cortices, or entry-points into the human nervous system. This includes, but is not limited to, nerve bundles associated with the eyes, ears, nose, mouth, skin, and deep tissue muscles.

It is another object of this invention to provide a device that creates higher-level cognitive association with a particular kind of negative stimulus or combination of stimuli created by a psychological or combination of psychological effects. Such an effect might include directed speech commands or other semantic cues, or it might include sounds, lights, or sensations that evoke memories or phobias.

The system according to one embodiment of the present teachings includes, but is not limited to, a plurality of sound deterrence devices or subsystems which collectively comprise a sound deterrence system, with a plurality of sensors distributed over a geographic area, at least one sonic emitter in each of the sound deterrence subsystems, and a controller. The controller, at least one of the sensors, the sonic emitter(s), and other components of the system may be disposed within a housing of the sound deterrence subsystem. The sensors are in communication with the controller, and communicate to the controller any images, sounds, and other data generated by a given sensor.

The controller may further be configured with an algorithm executing therein. The algorithm may generate a driver signal, and the driver signal may be further manipulated or amplified before being delivered to one or more sonic emitters.

The algorithm may have access to a computer memory storage which may contain a plurality of preset parameters or constraints in which the algorithm generates a driver signal, including but not limited to frequency domain ranges and time domain ranges. The purpose of these frequency and time domain ranges is to provide the driver signal (and thus the output of the sound deterrence subsystem) with a degree of variability or randomness. This is advantageous, as the human auditory cortex is generally configured to process sound in terms of rhythm and tone; sound which does not have a consistent rhythm or tone can therefore cause confusion, distress, and other symptoms of psychological and physiological disruption in a listener.

Within these ranges, the algorithm may randomly (e.g., purely randomly from an equal distribution or a weighted distribution, a frequency sweep, or other equivalent) sample a frequency, and the algorithm may relay that frequency as a driver signal to the sonic emitters. The algorithm may also sample a time from the time domain range, with the time typically measured in milliseconds (ms), and after the sampled time has passed the algorithm may re-sample a frequency from the frequency domain. This is a micro-level of randomness in the driver signal generation process.

At the macro-level, the algorithm may further employ a randomizer which introduces random or weighted variance into the domain ranges. Finally, the algorithm takes into account feedback from the sensors concerning the threat. Such feedback may indicate whether the attacker is retreating or otherwise standing down, with the algorithm reducing the amplitude of driver signals or otherwise returning the sound deterrence subsystem or system to a standby status. This feedback may also provide the algorithm with a means to fine-tune the driver signal such that a particular effect in the threat is observed. For example, the algorithm may optimize an increase in body temperature of the threat as a proxy for stress or fear, and accordingly direct the randomizer to select for domain ranges which increase body temperature. This is an iterative process occurring over an extended period of time, with the effect being the creation of an audio output of the sound deterrence subsystem which results in disruption of an identified target or threat.

The sensor or sensors may generate data such as images or sounds when the sensor identifies an attack or threat. This data is relayed to the controller in communication with the sensor or sensors, and the controller may utilize this data to trigger an output of the sound deterrence subsystem or system. Alternatively, remote access or an actuator may be provided on or in communication with the sound deterrence system to provide for manual activation or deactivation of the system.

In some embodiments, the controller may also feature or be in communication with an activation relay which may be accessed or activated locally or remotely, for example activating the sound deterrence subsystem or system by way of an operator manipulating a button or switch.

In another embodiment of the present teachings, the system includes, but is not limited to the addition of one or more LED arrays located on or in communication with the sound deterrence subsystem or system. The LED arrays are driven by a strobic processor in communication with the controller, and the strobic processor may also be located on the same (or an independent) shock absorbing housing. The strobic processor and LED arrays may further be mounted on their own heat sinks, or on the same heat sink as the amplifiers.

In other embodiments, the controller may further be configured to be in communication with one or more of the following supplemental devices: a chemical dispenser, such as tear gas or pepper spray or other gaseous area-denial chemical; an electrical effect, such as a taser or the actuation of a door, gate, or other electrical subsystem; a projectile dispenser, such as an alternative form of taser, a bean bag, or other nonlethal device; and a trap effect, such as a system of gates or doors on, for example, a narrow hallway.

In a second embodiment, the sound deterrence system may be comprised of a single sound deterrence subsystem in communication with a single sensor or a network of sensors distributed over a geographic area.

The sound deterrence subsystem housing may include a waveguide disposed within, which may be formed from aluminum or any other suitable material providing a sufficient level of rigidity and appropriate harmonics. Arranged in the waveguide may be a mid-frequency sonic emitter and at least one high-frequency sonic emitter, or a single or plurality of high-frequency sonic emitter(s). The high-frequency sonic emitter features a driver, which may be a piezoelectric ceramic element, coupled to a cone. The mid-frequency sonic emitter features a driver, which may be an electrically conductive coil disposed within a magnet or another equivalent voice coil driver system, coupled to a cone, with the cone oriented at the smaller end of an expanding horn, aero tube, aero port, or other equivalent device. The sound deterrence subsystem may also include at least one amplifier affixed to a heat sink plate and is configured to receive signals, such as digital or analog signals of any frequency or a range of frequencies, from an audio processor. The amplifier then relays those signals to the mid-frequency and high-frequency sonic emitters. The sound deterrence subsystem may further include an audio processor in communication with the controller and at least one amplifier configured to receive signals or audio frequencies from the controller and relay those signals or audio frequencies in an undisturbed, amplified, or modified manner to the amplifier.

In some embodiments, the controller may be configured with access to a plurality of pre-determined sound files. These sound files may include psychological content, such as the sound of a human or animal screaming, which may induce panic, fear, or psychological disruption in the identified attacker. The controller may be additionally configured to provide (either directly or via proxy through the audio processor and amplifiers) the high-frequency and mid-frequency sonic emitters with individual signals, such that the high-frequency sonic emitter is "playing a different tune" than the mid-frequency sonic emitter. The sounds may further be categorically different in type, such that one class of sonic emitter may produce organic sounds, while the other is producing an algorithmically generated randomized frequency sweep (e.g., "buzzing"), or any other combination disclosed herein. These sounds may further be manipulated by the algorithm to produce the randomized iterative effect disclosed herein, converging on a pattern that maximizes disruption in the threat.

In a third embodiment of the present teachings, the system described herein additionally includes a database with external (e.g., populated via network communication or other means) and internal storage. The database may include publicly available or legally accessible information such as medical records, information regarding images and names of persons to facilitate facial recognition, or other such information disclosed herein. The database may further include pre-determined sound files, parameter matrices, or other information to facilitate the operation of the sound deterrence system.

The algorithm may access signals from the plurality of sensors to identify a threat in the geographic area. The algorithm may then compare the signals generated from images, sounds, and other data concerning the threat to the database to determine pertinent information about the threat or attacker. For example, the algorithm may determine that the attacker is wielding a firearm, or has an outstanding warrant. In this case, the sound deterrence system may be activated. The algorithm may further use images and other data in the database to infer that a threat is standing down, lowering a weapon, or otherwise retreating. The algorithm may also, by querying the database including personnel records and observing the GPS position of the reporting sensor, determine that the attacker is not a threat at all, but rather an employee or other security personnel employed by the protected area or facility. In this case, the sound deterrence system may be deactivated or otherwise report a warning message to the individual (e.g., that the area is closed).

In other embodiments, the algorithm may query a database with an identity of a threat and the database may report medical information concerning the individual. For example, the individual might suffer from epilepsy or a mental health condition. In this example, the algorithm may attenuate or otherwise moderate the iterative driver signal generation process such that the threat is deterred but not unnecessarily harmed. This protective goal may be achieved through disabling an optional LED array, or interpreting feedback data from the sensors of erratic movement in the threat following an output of sound in light of the potential for a seizure or other involuntary movement in the threat.

Other features and aspects of the invention will become apparent from the following detailed description, taken in conjunction with the accompanying drawings, which illustrate by way of example the features in accordance with embodiments of the invention. The summary is not intended to limit the scope of the invention, which is defined solely by the claims attached thereto.

DETAILED DESCRIPTION

The following description is presented for illustrative purposes only and the teachings should not be limited to these embodiments. Any system or controller configuration and architecture satisfying the requirements described herein may be suitable for implementing the sensory disruption system and method of the present embodiments.

The invention aims to satisfy the following requirements:

Disorientation: It is an object of this invention to generate intense light, sound, smell, heat, or touch to maximize disorientation of an intruder or attacker intent on fatal bodily harm on the occupants or property of a public or private space.

Distress: It is an object of this invention to generate intense light, sound, smell, touch to maximize distress of an intruder or attacker intent on fatal bodily harm on the occupants or property of a public or private space.

Incapacitation: It is an object of this invention to generate intense light, sound, smell, touch to immobilize an intruder or attacker.

Immobilization: It is an object of this invention to generate intense light, sound, smell, heat, or touch to maximize the immobilization of an intruder or attacker intent on fatal bodily harm on the occupants of a public or private space.

Pain: It is an object of this invention to generate intense light, sound, smell, touch to maximize pain directed at an intruder or attacker intent on fatal bodily harm on the occupants or property of a public or private space.

Remote: It is an object of this invention to control a device or devices deployed in a public or private space capable of generating the described effects. It is an additional object of this invention to provide a device or devices capable of remote activation and provision of non-lethal defenses by authorized police and military services.

Figure 1:
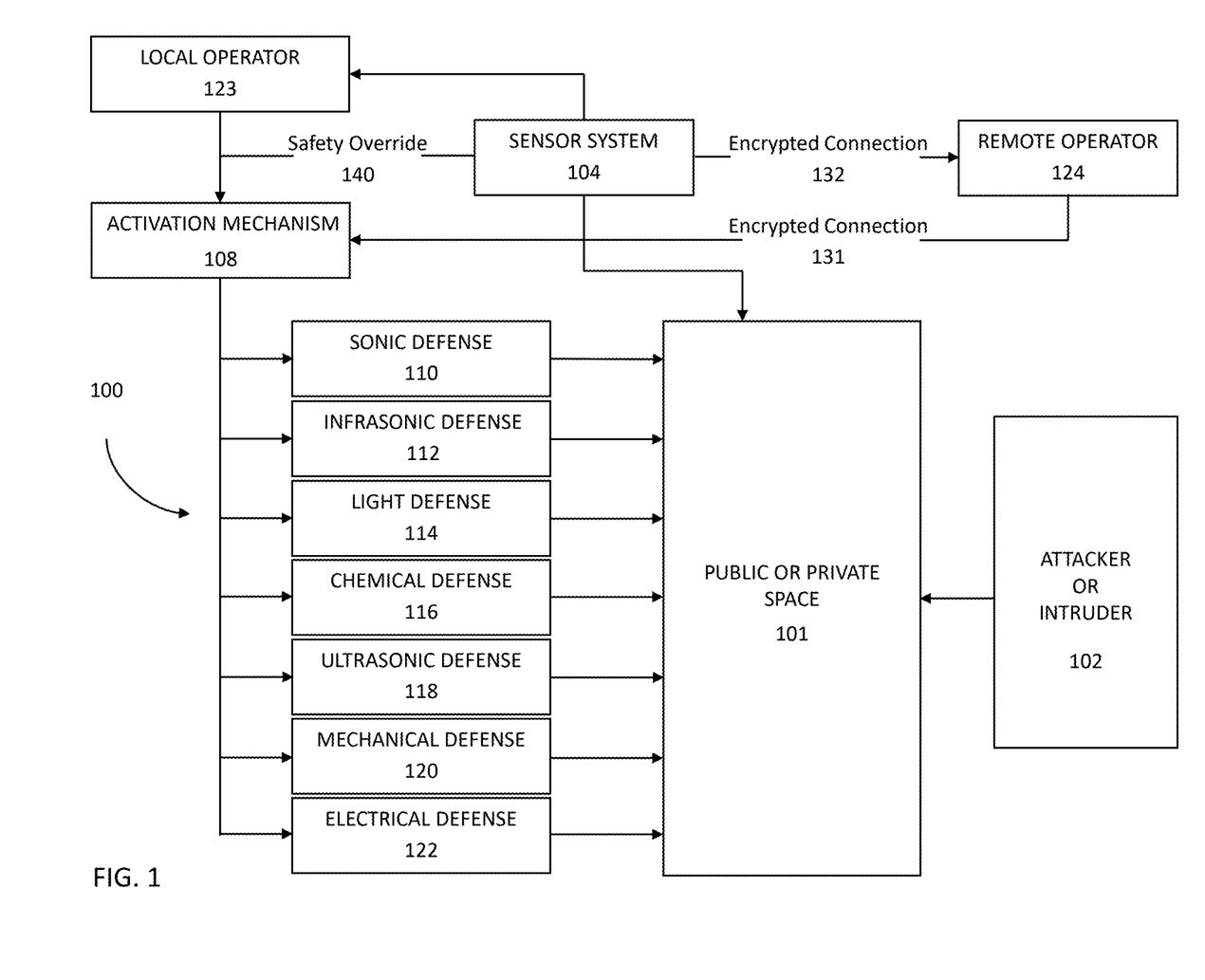
FIG. 1 is a sensory disruption system for producing negative physiological or psychological effects on an attacker or intruder.

FIG. 1 is a block diagram of a sensory disruption system 100 for producing negative physiological and psychological effects on an attacker or intruder 102 which may enter or threaten a space or an entity, such as a public or private space 101, protected by the sensory disruption system 100. The negative physiological and psychological effects may consist of any number of defensive effects such as: audible sonic 110, infrasonic 112, and ultrasonic 118 sound effects; light effects 114 such as strobic LEDs or chemically induced light or sound effects 116; chemical effects such as tear gas or pepper spray 116; electrical defenses 122 such as tasers or other electrical barriers; and mechanical effects 120 such as non-lethal projectiles or trap mechanisms. A multi-sensory or psychological disruptor system like the one illustrated in FIG. 1 produces a stacking or multiplying effect that has the potential to render an attacker or intruder incapacitated without mortally harming them. In some embodiments, a stacking or multiplying multi-sensory or psychological effect is achieved through the use of a plurality of sensory disruption systems, each sensory disruption system delivering one or more of the defensive effects.

The defensive sensory disruption apparatus described in FIG. 1 may be fixed in place, movable, or robotically controlled, such as on an actuator or robot, or a mobile device or vehicle, that may be directed at an attacker 102. This device may also be organized into an array of apparatuses to form a directional device or as a distributed array over larger areas as an Area of Effect (AOE) system, either indoors or outdoors.

The system 100 may utilize a local operator 123 or a connection to an external operator or agency with authority to activate the device remotely 124, or by authorized personnel on site using a conventional switch, button, or other actuation method directly on or near the device 108. A connection to an external operator or agency may preferably feature an encrypted connection both to 131 and from 132 the sensory disruption system.

The system 100 may utilize a connection to an external server or edge computer 126 with a connection to the internet. The apparatus may utilize local or internal information for the purpose of acquiring additional information on the attacker through public or private databases through authorized and legal means, aimed at enhancing negative sensations or psychological effects specifically intended for the attacker, such as modifying parameters of sound, strobic effects, noise, light, and semantic information via an algorithmic method detailed in FIG. 6, and may be processed either on a computer processor or local server 200 with a co-located GPU 208 located on the apparatus, or on a cloud sever via an encrypted internet connection 210 as detailed in FIG. 2. The apparatus may further utilize the local or internal information (e.g., medical information) for the purpose of adjusting parameters of sound, strobic effects, noise, and light to moderate negative sensations or psychological effects specifically intended for the attacker in the interest of avoiding lethal or excessively harmful effects. The local or internal information may consist of images, text, voice snippets, or medical data gleaned from ubiquitous machine learning algorithms tailored for specific types of information separation and identification.

One or more sensors 104 located in the proximity of the device may activate the device 108 when gunshots or other relevant attack information is detected, such as firearm identification or other indicators. In other embodiments, one or all of the sensors 104 may be located on the device itself. Additionally, multiple sensors 104 located in the proximity of the device or on other devices may be in communication with a single or multiple devices. A safety override 140 may further be present between the local operator 123 and the one or more sensors 104, for example providing the ability for the local operator to disable sensor input to the activation mechanism 108 in the event of a false positive or other reason.

Figure 5:
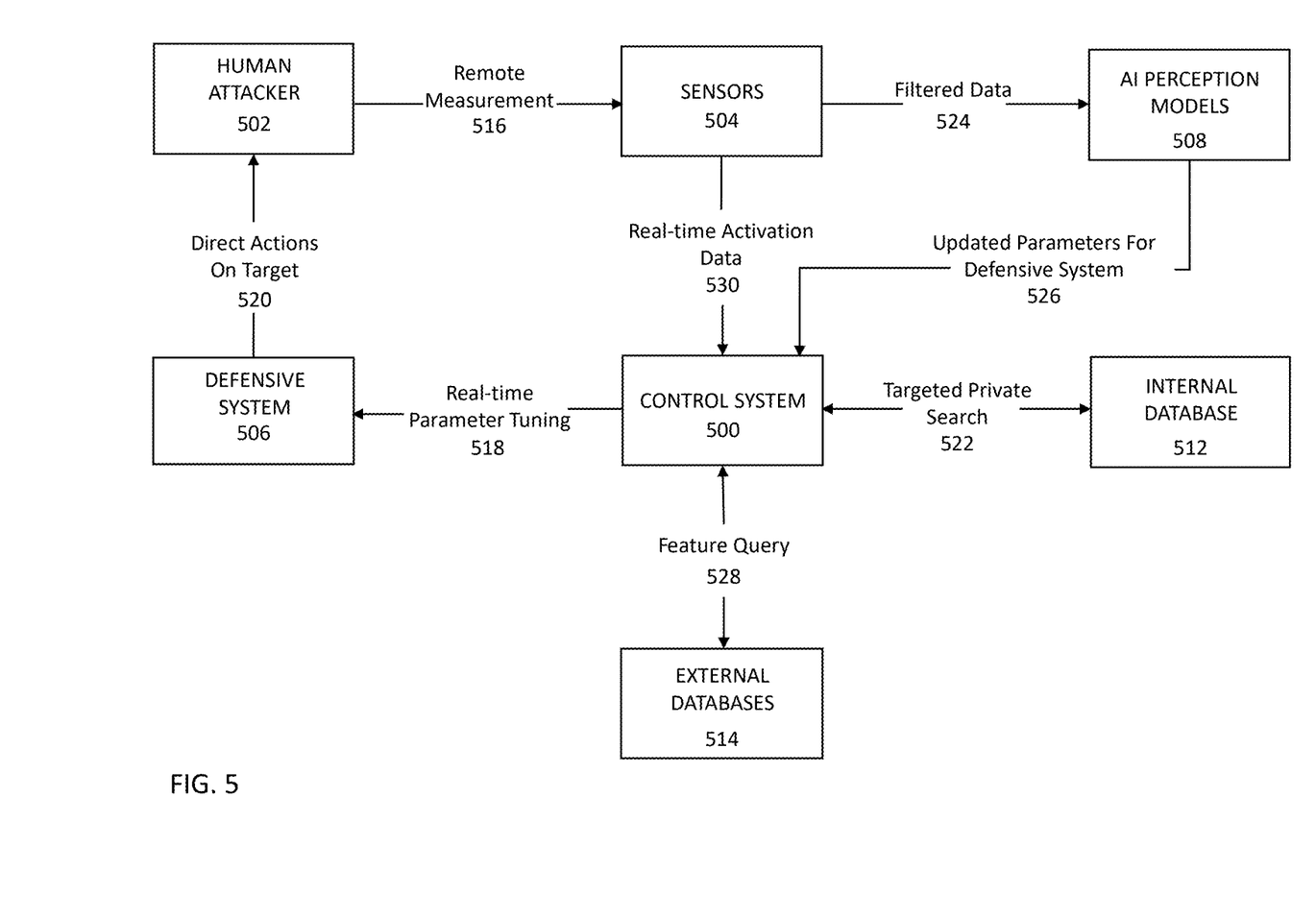
FIG. 5 is a block diagram of a sensory deterrent system of FIG. 1 that includes the positive feedback algorithm used to increase multi-sensory deterrent effects on a target.

Data gathered from the sensor(s) 104 located in the proximity of the device may produce feedback between the attacker and the apparatus, as further detailed in FIG. 5. Data gathering may be performed through measurements acquired by sensors 104 and connected to the device through a standard input bus or wireless connection, such as cameras or microphones. Where a plurality of sensors 104 are employed, individual sensors may gather discrete types of data, e.g., a plurality of sensors may include a camera, a microphone, a thermal imaging device, an x-ray device, a multi-spectrum light sensing device, a radar device, or other such devices. In other embodiments, one or more sensors may include an individual sensor capable of gathering two or more types of data, e.g., a sensor may include a visible light camera and a low-light (i.e., night vision) or infrared camera and a microphone. Feedback between the attacker and the apparatus may be aimed at enhancing negative sensations or psychological effects specifically intended for the attacker, such as modifying parameters of sound, strobic effects, noise, light, and semantic information via an AI or other generative algorithmic method 200, 208, so as to create a feedback response with the target. This feedback tailors the response of the sensory disruption apparatus 100 to a particular individual. These responses may include but are not limited to common stress indicators such as: increased heart rate, perspiration, body temperature, erratic movements, and body language.

Figure 2:
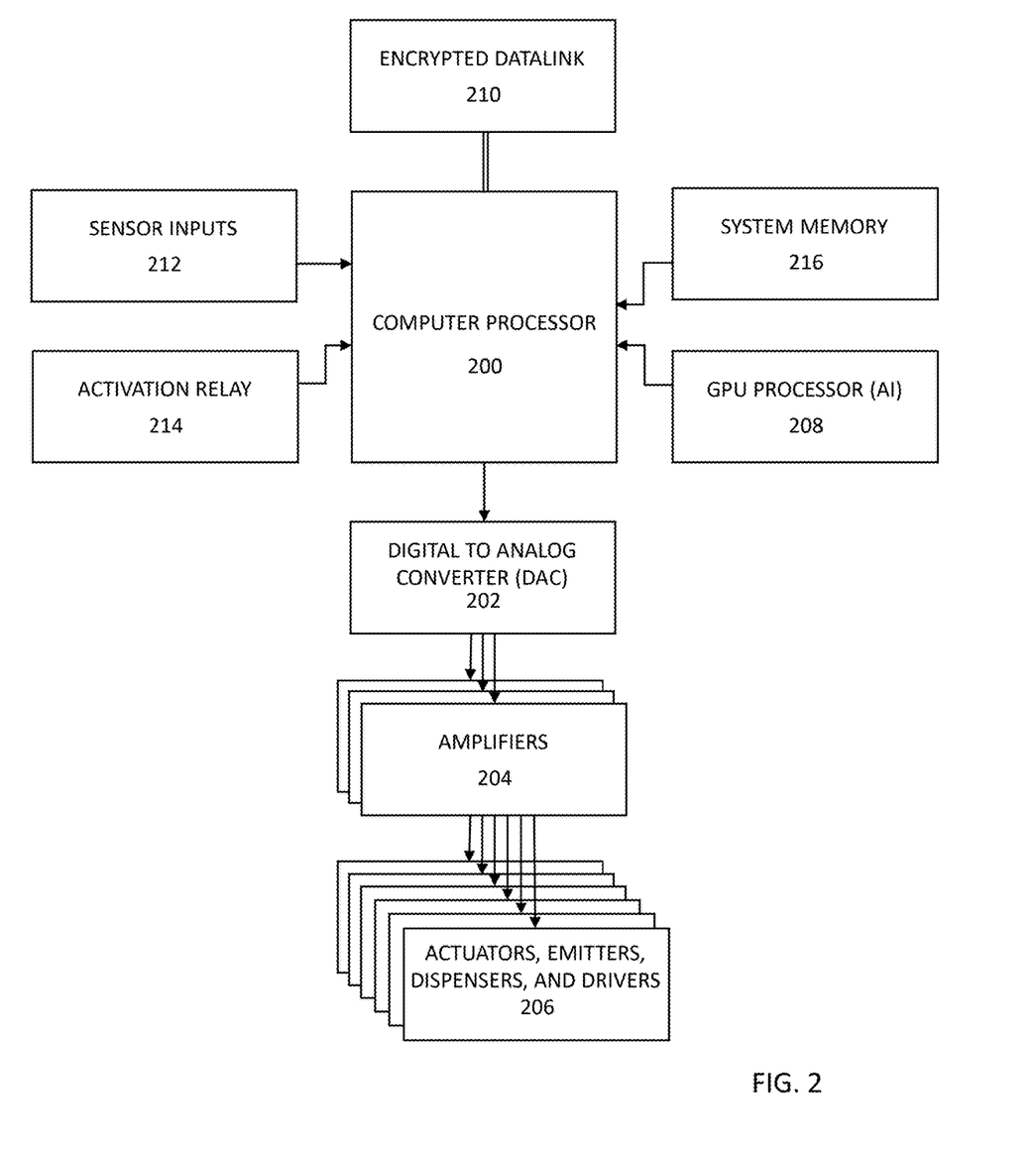
FIG. 2 is the physical decomposition of the sensory disruption system of FIG. 1 with adaptable sensor feedback.

System memory 216 may store pre-recorded sounds, patterns, or other data created for the purpose of achieving distress in the intruder or attacker. FIG. 2 illustrates a general form of the sensor disruption apparatus. Signals generated on the computer processor 200 and GPU processor 208 for the purpose of creating disruptive physiological and psychological effects are then converted to analog signals 202, and then distributed to a set of amplifiers 204 for the purpose of operating one or more actuators, emitters, dispensers, or drivers 206, that exact defensive effects 110-122 directed at an attacker or attackers.

Figure 3:
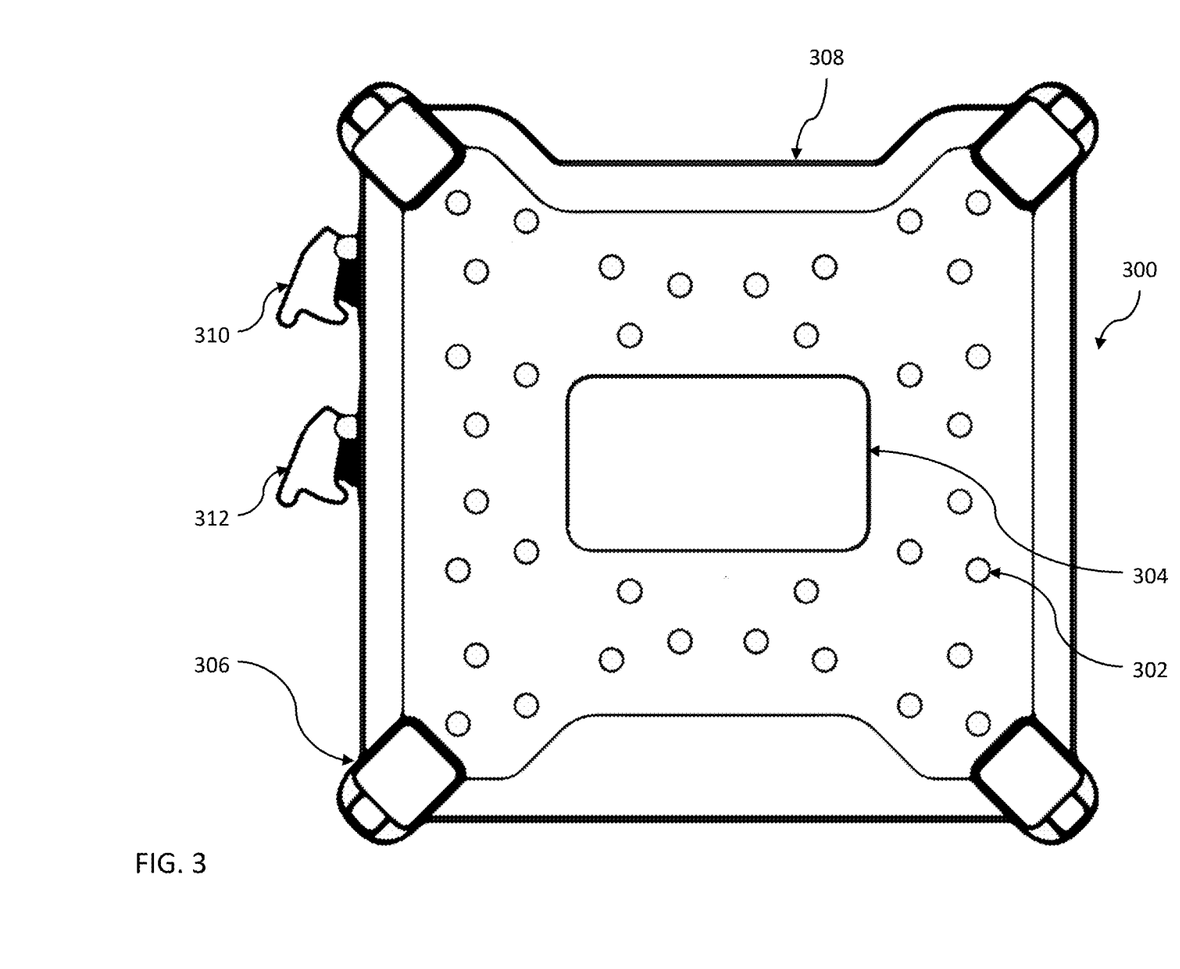
FIG. 3 depicts the invention of FIG. 1 as a multi-sensory disruption system utilized in sound and light emitter networks.

FIG. 3 illustrates an embodiment of the sensory disruption apparatus 300 in front view, targeting hearing using one or more high-frequency sonic emitters 302 and a mid-frequency sonic horn emitter 304, and using one or more high-intensity LED array(s) 306. This device includes manual activation using a switch actuator 312, and a sentry mode with an arm switch 310 and integrated sensor 308.

In many embodiments, the mid-frequency sonic emitter is a compression-type speaker with an exponential horn. The mid-frequency sonic emitter may be driven by a piezoelectric ceramic element, though in other embodiments it is driven by a compression driver such as a conductive voice coil disposed within a magnet. The shape of the horn can be estimated by the function $x=\log*y^{\hat{}}(n)$, where n is a real number between six (6) and nine (9), inclusive, and where x denotes a point along an axis normal to and extending from the base of the horn, and where y denotes a corresponding point on the surface of the horn. In one embodiment, the outlet of the horn measures two (2) inches tall and six (6) inches wide, with a depth of four (4) inches. Other embodiments may feature a mid-frequency sonic emitter with a horn approximately proportionally larger or smaller. In some embodiments, the mid-frequency sonic emitter may have an upper operational frequency bound of 25,000 Hz and a lower operational frequency bound of 250 Hz.

In many embodiments, the high-frequency sonic emitter is a compression type speaker with an exponential cone with a plate waveguide. In some embodiments, the high-frequency sonic emitter is driven by a piezoelectric ceramic element. In other embodiments, the high-frequency sonic emitter may also feature an exponential horn, the horn having an approximately round or approximately square or rectangular outlet. The shape of the cone can be estimated by the function $x=\log*y^{\hat{}}(n)$, where n is a real number between two (2) and three (3), inclusive, and where x denotes a point along an axis normal to and extending from the base of the cone, and where y denotes a corresponding point on the surface of the cone. In one embodiment, the high-frequency sonic emitter has a cone measuring 47.7 millimeters in diameter and 9 millimeters in depth. Other embodiments may feature a high-frequency sonic emitter with a cone approximately proportionally larger or smaller. In some embodiments, the high-frequency sonic emitter may have an upper operational frequency bound of 32,000 Hz and a lower operational frequency bound of 700 Hz.

Figure 4:
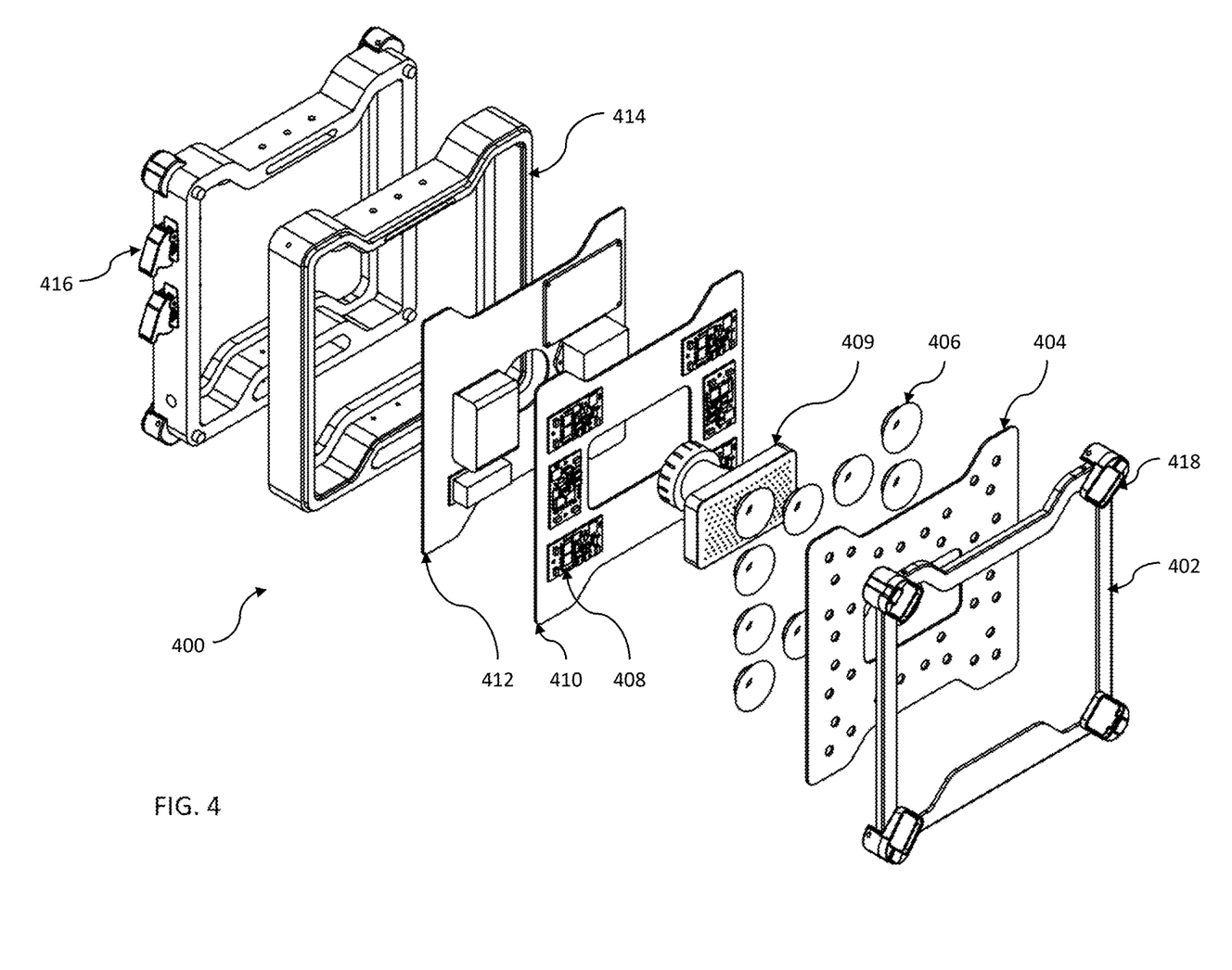
FIG. 4 is an exploded view detailing the invention of FIG. 1 as a multi-sensory disruption system utilized in sound and light emitter networks.

FIG. 4 illustrates the exploded view of the embodiment described in FIG. 3, consisting of twelve high-frequency sonic emitters 406, attached to an aluminum waveguide 404, embedded in a frame 402. A mid-frequency sonic emitter 409 may preferably be arranged in the center of the aluminum waveguide 404, though one or more mid-frequency sonic emitter(s) may be arranged in any position. The emitters 406 and 409 are powered by one or more amplifiers 408 mounted on a heat-sink plate 410. The signals are generated by the audio processor board located on the electronic motherboard 412 protected by a shockproof frame 414. The heat sink plate 410 may also be protected by the same or duplicate shockproof frame 414. The shockproof frame 414 is preferably configured to isolate the electronic motherboard 412 and other electronic components from both internal vibrations created by the high-frequency 406 and mid-frequency 409 sonic emitters and external vibrations (e.g., vibrations incurred during use, such as the device being shaken or dropped, vibrations incurred during transportation, and other such vibrations). A strobic processor may be located on the electronic motherboard 412 to drive one or more LED arrays 418 located on the front or an exterior of the device. One or more actuators 416 allow for manual operation of motion sensor activation or instant activation of the device.

In many embodiments, the amplifiers are H-bridge amplifiers, provided with a power supply of between five (5) and twelve (12) volts, and capable of a power output of between 30 and 80 volts pole-to-pole. This configuration is advantageous as the upper operational frequency bounds of the high-frequency sonic emitters and mid-frequency sonic emitter are substantially higher than the 20,000 Hz typical of audio systems commonly known in the art. In one embodiment, a single amplifier is configured to drive two (2) high-frequency sonic emitters, with the voltage-resistive drivers of the high-frequency sonic emitters arranged in parallel. This configuration is advantageous, as failure due to heat, vibration, physical penetration, electrical interference, or other mode of failure does not render all sonic emitters inoperative. Other configurations are possible, including single amplifier-emitter configurations utilizing lower-powered amplifiers, or single-amplifier plurality-emitter configurations utilizing a higher-powered amplifier with low-resistance drivers arranged in series or high-resistance drivers arranged in parallel. In other embodiments, the amplifiers may be A, AB, B, or D class amplifiers.

In many embodiments, the ideal ratio of the number of high-frequency sonic emitters to mid-frequency sonic emitters is between six (6) and twelve (12) to one (1). In other embodiments, the sensory disruption apparatus may feature a plurality of mid-frequency sonic emitters in a single apparatus. Additionally, a plurality of sensory disruption apparatuses may be in communication and used in a networked manner; in this embodiment, a single sensory disruption apparatus may exclusively use (a) mid-frequency sonic emitter(s) while other sensory disruption apparatuses may exclusively use high-frequency sonic emitters. Any further combination of a number of sonic disruption apparatuses and sonic emitters may also be employed.

A plurality of amplifiers 408 may be configured to receive independent and different signals generated by one or more audio processor board(s) located on the electronic motherboard 412, with the plurality of amplifiers 408 powering the high-frequency sonic emitters 406 and mid-frequency sonic emitter 409. The high-frequency sonic emitters 406 and mid-frequency sonic emitter 409 may generate different outputs in response to receiving different (both discrete and overlapping) signals as generated by one or more audio processor board(s) and passed through a plurality of amplifiers 408.

FIG. 5 provides an example block diagram showing a central control system 500 or controller in an embodiment of the positive feedback algorithm used to increase multi-sensory deterrent effects on a human target. A central control system 500 continuously updates parameters 518 for the defensive system 506, which may consist of one or many embodiments described in prior sections, upon a human attacker 502. Using sensors located in proximity of a human attacker 502, the system performs remote measurement of images, sounds, or other data 516. This data may be used either in real-time for immediate system actions 530 such as sounds of a gunshot or stills of a weapon being fired or processed as filtered data 524 for pre-trained AI perception models 508. These AI perception models 508 process the data for the purpose of providing recursively updated parameters for control system 526. Additionally, the control system 500 may perform targeted queries 522 on an internal database 512, such as a personnel record, or on external databases 514 such as public records or social media using a feature query 528.

Figure 6:
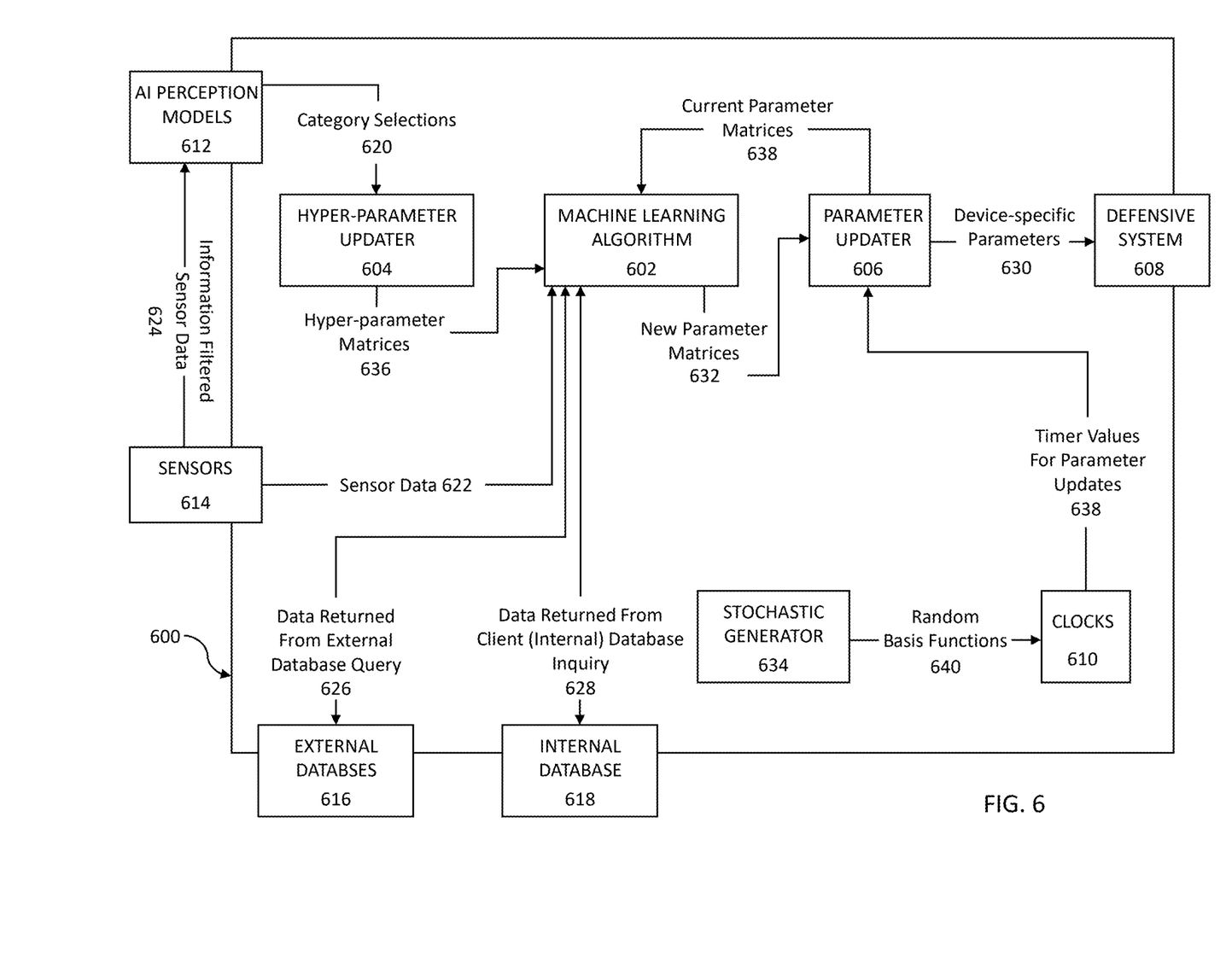
FIG. 6 is a control system algorithm for multi-sensory deterrent parameter selection and feedback in the invention of FIG. 1.

An embodiment of the control system algorithm for multi-sensory deterrent parameter selection and feedback is described in FIG. 6. This control algorithm utilizes three main components: a hyper-parameter updater 604, a probabilistic Bayesian Inference algorithm 602, and a parameter updater 606. Sensor inputs 614 are pre-processed through information filters 624 for specifically trained AI perception models 612, which then evaluate the sensor information providing specific categorical selections 620. The hyper-parameter updater 604 then passes the hyper-parameter matrices 636 or a priori information to the Bayesian inference algorithm 602, which may consist of a standard algorithm such as the Dirichlet Process.

Depending on the current state of the Bayesian inference algorithm, the system may query (626, 628) either an internal database 618 such as a personnel record, or external databases 616 such as social media or publicly available records.

The Bayesian inference algorithm then produces new parameter matrices 632 from the sensor data 622 gathered from the sensor(s) 614. The parameter updater 606 then processes these matrices with a specified amount of temporal and parameter variance introduced via internal clocks 610 with constantly changing clock rates provided by a stochastic generator 634, which may consist of a random number generator or some other kind of sampled noise generator. In other embodiments, temporal and parameter variance may be introduced via an arbitrary noise generator that is sampled at some frequency rate, with upper and lower frequency parameters or filter parameters stored in a database or other memory storage device (e.g., temporary random-access memory).

The device-specific parameters 630 are then sent to the defensive system 608 illustrated in FIG. 1 through FIG. 4.

The parameter updater 606 then transmits the current parameter matrices 638 back to the Bayesian inference algorithm 602, updating the current parameter state information. Sensors 614 then perceive the attacker(s) and the system processes the information again until the system converges on an optimal parameter configuration.

For example, a sensor 614 may initially detect an attacker, the sensor data 622 setting a parameter 630 which is sent to the defensive system 608 and effects an output of sound by the defensive system. The sensor 614 may further detect the attacker continues to move (e.g., toward the defensive system or other object), and in response to the sensor data 622 an additional parameter 630 may be sent by the parameter updater 606 to the defensive system 608 effecting a change in output of sound by the defensive system (e.g., a change in tone or frequency of the output of sound, or an increase in volume of the output of sound).

For example, the sensor 614 may alternatively or concurrently generate data 622 based on other aspects of the attacker, such as a measurement of the body temperature of the attacker. In some embodiments, the algorithm may seek to optimize (e.g., increase) the body temperature of the attacker as a proxy for the generation of a physiological stress response condition. Sensor data 622 generated by a sensor 614 of the body temperature of an attacker may be recorded by the system. Following the output of sound by the defensive system 608, the sensor 614 may additionally record sensor data 622 of the body temperature of an attacker in response to the output of sound. The parameter updater 606 may set an additional parameter 630 effecting a change in the output of the defensive system 608 (e.g., an increase or decrease in sound output frequency or amplitude). The system may further converge on an optimal parameter 630 to maximize the physiological response in the attacker.

Figure 7:
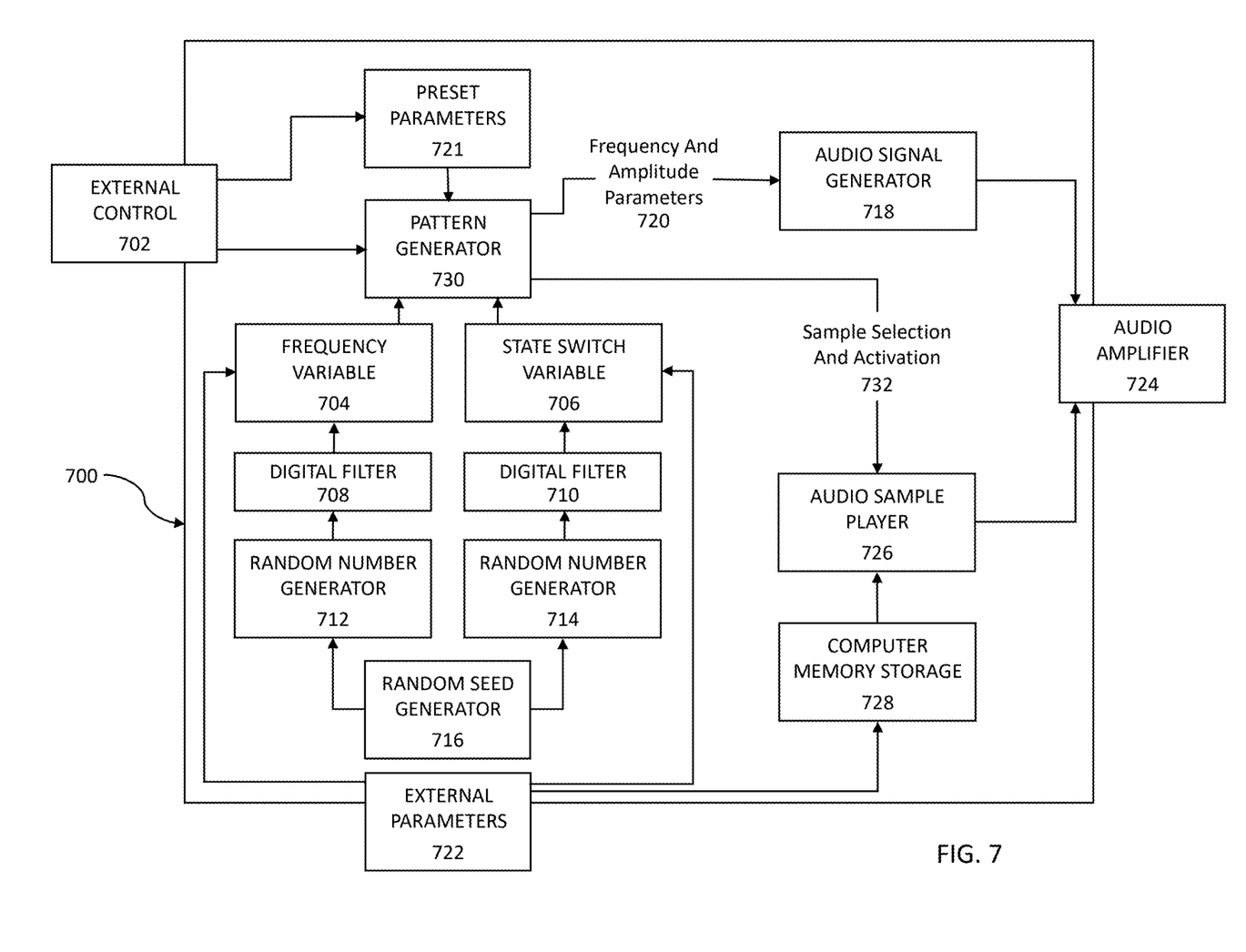
FIG. 7 is a stochastic sound deterrent control with hybrid sound synthesis and sound sampling for the invention of FIG. 1.

FIG. 7 illustrates a stochastic sound deterrent control with hybrid sound synthesis and sound sampling system that can be used as a central processing and signal generator for embodiment 300 in FIG. 3. In this configuration, some external control 702 triggers a pattern generator 730 which may start digitally transmitting frequency and amplitude parameters 720 to a signal generator 718, which in turn sends amplified audio signals to an audio amplifier module 724 which may be a signal amplifier for a regular loudspeaker module, or an amplifier for mid-frequency and high-frequency buzzers, or both.

The pattern generator 730 also may start digitally transmitting sample selections and/or play commands to an audio sample player 726, which may load from computer memory storage 728 one or a set of different sound files. The pattern generator 730 may also call preset parameters 721 that set frequency ranges or a median frequency, amplitude thresholds, amplitude functions, signal scale values, time ranges, sound file selection parameters, or sample trigger parameters. Also connected to the pattern generator 730 is one or a plurality of random number generators 712 and 714, which may be filtered to a specific range using standard digital filters 708 and 710, which can then be used to continuously set sound frequency variables 704, such as the low and high frequency range values or median frequency. It can also be used to continuously set a state switch variable 706, which affects how often a particular pattern is changed in the pattern generator 730.

For example, a preset parameter 721 may set a median frequency of 2,700 Hz, a frequency range 704 of 1,000 Hz (for an upper bound of 3,700 Hz and a lower bound of 1,700 Hz), and a time range 706 of 5 ms (such that the frequency varies between the upper and lower bounds every 5 ms). The randomizer (712, 714) may be filtered to a specific range of 700 Hz to 32,000 Hz by the digital filter (708,710). Initially, the pattern generator 730 will transmit a 2,700 Hz sound, and every 5 ms thereafter the pattern generator will randomly transmit a new sound from an evenly distributed set of frequencies between 1,700 Hz and 3,700 Hz. The pattern generator may randomly transmit a new sound from the frequency range in a number of different ways, such as a frequency sweep, a purely random selection among the range, or any other non-predetermined means.

The randomizer will modify the frequency range (within the bounds allowed for by the digital filter) and the time range, setting a new sound frequency variable and a new state switch variable. The randomizer may set the new variables at a generally lower rate than the rate specified by the state switch variable, and this rate may be in proportion to the median frequency in the preset parameter (e.g., the randomizer may set the new variables every 27 ms where the preset parameter includes a median frequency of 2,700 Hz). For example, the randomizer may set a new frequency variable of 2,000 Hz and a new state switch variable of 2.5 ms. Thereafter, the pattern generator will transmit a new sound every 2.5 ms randomly from an evenly distributed set of frequencies between 700 Hz and 4,700 Hz. Alternatively, the randomizer may additionally set a new median frequency, or any combination of frequency variable and state switch variable.

The randomizer may further operate with feedback from the controller, sensors, algorithm, and other elements of the present invention to effect a narrowing or broadening of the range in which the randomizer is setting new frequency and state switch variables. In this way, the randomizer functions as a means for exploring a given parameter space and narrowing the parameter space to converge on an optimal parameter or range of parameters. For example, as sensors generate data relating to an attacker demonstrating an increase in body temperature, the system may converge on an ever-narrowing range of variables in the interest of maximizing an increase in the attacker's body temperature (e.g., as a proxy for stress). Alternatively, where the sensor is generating image data and the attacker is lowering a raised weapon, the system may converge on a range of variables in the interest of causing the attacker to fully lower and/or set down the weapon.

It is known that the human auditory cortex processes sound impulses in terms of rhythm (or rate accumulation) and sound (or frequency). Varying both the frequency domain and time domain of a sound at a high sample rate results in the physiological and psychological effects described herein as a consequence of the disruption of the attacker's hearing and sound processing abilities.

Sound files stored in the computer memory storage 728 may include sound files with psychological content specially designed to induce panic, fear, and other sensations or emotions which result in psychological disruption. For example, a sound file stored in the computer memory storage 728 may include recordings of sounds of a human or animal screaming. The pattern generator 730 may further transmit a plurality of frequency and amplitude parameters 720 to the signal generator 718, with the audio amplifier module 724 receiving the plurality of amplified audio signals and transmitting specific selections of the plurality of amplified audio signals to amplifiers connected to mid-frequency sonic emitters and high-frequency sonic emitters, such that the mid-frequency sonic emitter and high-frequency sonic emitter produce different audible sounds.

In some embodiments, the production of different audible sounds may be achieved through calling a plurality of preset parameters 721 at discrete or overlapping frequency ranges, amplitude thresholds, amplitude functions, signal scale values, time ranges, sound file selection parameters, or sample trigger parameters. In other embodiments, the production of different audible sounds may also be achieved through the one or plurality of random number generators 712 and 714 connected to the pattern generator 730 being filtered to different specific ranges using standard digital filters 708 and 710 continuously setting different sound frequency variables 704.

For example, the mid-frequency and high-frequency sonic emitters may produce audible sounds in different frequency ranges, patterns, or otherwise different noises. Alternatively, the mid-frequency sonic emitter may produce audible sounds contained in a sound file with psychological disruption content such as a human or animal screaming, while the high-frequency sonic emitter may simultaneously produce audible sounds contained in a sound file or generated by the pattern generator 730 which may be non-natural content such as synthesized sounds. The effect of the production of sounds in different frequency ranges, patterns, or otherwise different noises may in some embodiments be the creation of acoustic intermodulation distortion products (e.g., the generation of new sounds, tones, or frequencies not present in the input sounds, tones, or frequencies) or other electronically generated sounds. Intermodulation distortion products may further be introduced by nonlinearities or time variance in the system.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A sound deterrence system comprising:
a plurality of sensors geographically spaced apart for monitoring threats and generating signals indicating a location of a threat;
a plurality of sound deterrence subsystems, at least one of which is located in a vicinity of each of said geographically spaced apart sensor locations;
at least one sonic emitter in each of said plurality of sound deterrence subsystems;
a controller configured to communicate a driver signal to individual ones of each of said plurality of sound deterrence subsystems based upon receipt of a threat signal from one or more of said plurality of sensors; and
an algorithm executing on said controller for generating the driver signal, the algorithm taking a random sample of one or more frequencies from within a frequency domain range, the algorithm taking a random sample of a time interval from within a time domain range, and the algorithm continuously generating and regenerating the driver signal at said random samples of time intervals with said random samples of one or more frequencies.

2. The sound deterrence system of claim 1, wherein the plurality of sensors generate image, sound, thermal, biometric, and other signals relating to the threat.

3. The sound deterrence system of claim 2, wherein the algorithm further includes a randomizer, the randomizer varying the upper and lower bounds of the time domain and frequency domain range.

4. The sound deterrence system of claim 3, wherein the algorithm accesses signals generated by the plurality of sensors, the algorithm provides the randomizer with filters based upon said signals, said filters limit the range in which the randomizer may vary the upper and lower bounds of the time domain and frequency domain, and the algorithm evaluates a difference in the signals before and after providing the randomizer with said filters.

5. The sound deterrence system of claim 4, wherein the algorithm narrows or broadens the filters in response to a difference in signals from the plurality of sensors, the algorithm provides the randomizer with the new iteration of the filters and evaluates the difference in signals from the plurality of sensors before and after providing the randomizer with the new iteration of the filters, the algorithm repeating said narrowing or broadening process, and the algorithm converging on a parameter or range of parameters maximizing a psychological or physiological effect on the threat.

6. The sound deterrence system of claim 1, further comprising a strobic processor in communication with the controller, the strobic processor driving a plurality of LED arrays in each of the plurality of sound deterrence subsystems.

7. The sound deterrence system of claim 1, wherein the controller is further configured to be in communication with at least one of a light, a chemical dispenser, an electrical effect, a projectile dispenser, and a trap effect.

8. The sound deterrence system of claim 1, wherein the controller is in communication with an activation relay, the activation relay communicating data to the controller.

9. A sound deterrence system comprising:
a plurality of sensors geographically spaced apart for monitoring threats and generating signals indicating a location of a threat;
a housing containing the sound deterrence system located in a vicinity of one of said geographically spaced apart sensor locations;
at least one high frequency sonic emitter in said housing;
a mid frequency sonic emitter in said housing;
a controller configured to communicate a first driver signal to said high frequency sonic emitters and a second driver signal to said mid frequency sonic emitter based upon receipt of a threat signal from one or more of said plurality of sensors; and
an algorithm executing on said controller for generating the first and second driver signals respectively, the algorithm taking a first and second random sample of one or more frequencies from within a first and second frequency domain range, the algorithm taking a first and second random sample of a time interval from within a first and second time domain range, and the algorithm continuously generating and regenerating the first and second driver signal at said first and second random samples of time intervals with said first and second random samples of one or more frequencies.

10. The sound deterrence system of claim 9, wherein the controller is configured with access to a plurality of sound files containing psychological content, the second frequency domain range being comprised of said plurality of sound files, and the algorithm generates the second driver signal by taking a second random sample of one or more of said second frequency domain range such that the output generated by the mid frequency sonic emitter induces panic, fear, and psychological disruption in the threat.

11. A sound deterrence system comprising:
a plurality of sensors geographically spaced apart for monitoring threats and generating signals indicating a location and an identity and sounds of a threat;
a plurality of sound deterrence subsystems, at least one of which is located in a vicinity of each of said geographically spaced apart sensor locations;
at least one sonic emitter in each of said plurality of sound deterrence subsystems;
a controller configured to communicate a driver signal to individual ones of each of said plurality of sound deterrence subsystems based upon receipt of a threat signal from one or more of said plurality of sensors;
an algorithm executing on said controller for generating the driver signal, the algorithm taking a random sample of one or more frequencies from within a frequency domain range, the algorithm taking a random sample of a time interval from within a time domain range, and the algorithm continuously generating and regenerating the driver signal at said random samples of time intervals with said random samples of one or more frequencies; and
a database containing at least images, video, text, audio samples, voice snippets, medical data, personnel records, said controller configured to access said database.

12. The sound deterrence system of claim 11, wherein the algorithm accesses signals of a location and an identity of a threat generated by at least one of the plurality of sensors, said algorithm compares said signals to the database including images and personnel records, and said algorithm determines whether said threat is authorized to be in the vicinity of the geographic area in which said sensor is located.

13. The sound deterrence system of claim 11, wherein the algorithm further includes a randomizer, the randomizer varying the upper and lower bounds of the time domain and frequency domain range.

14. The sound deterrence system of claim 13, wherein the algorithm accesses signals generated by the plurality of sensors, the algorithm provides the randomizer with a first filter set based upon said signals, said first filter set limits the range in which the randomizer may vary the upper and lower bounds of the time domain and frequency domain, and the algorithm evaluates a difference in the signals before and after providing the randomizer with said first filter set.

15. The sound deterrence system of claim 14, wherein the algorithm accesses signals of an identity of a threat generated by at least one of the plurality of sensors, said algorithm compares said signals to the database, and said algorithm provides the randomizer with a second filter set based upon comparison of said signals to said database.

16. The sound deterrence system of claim 15, wherein the second filter set limits or increases the range in which the randomizer may vary the upper and lower bounds of the time domain and frequency domain, and the algorithm evaluates a difference in the signals before and after providing the randomizer with said second filter set to reduce physiological or psychological effects on a threat based upon medical data belonging to the threat.

17. The sound deterrence system of claim 16, wherein the algorithm narrows or broadens the second filter set in response to a difference in signals from the plurality of sensors, the algorithm provides the randomizer with the new iteration of the second filter set and evaluates the difference in signals from the plurality of sensors before and after providing the randomizer with the new iteration of the second filter set, the algorithm repeating said narrowing or broadening process, and the algorithm converging on a parameter or range of parameters maximizing indications of deterrence in the threat within the constraints of ensuring a non-lethal effect on the threat.

18. The sound deterrence system of claim 15, wherein the second filter set limits or increases the range in which the randomizer may vary the upper and lower bounds of the time domain and frequency domain, and the algorithm evaluates a difference in the signals before and after providing the randomizer with said second filter set based upon image and sound data of the threat indicating the threat is advancing or retreating.

19. The sound deterrence system of claim 18, wherein the algorithm narrows or broadens the second filter set in response to a difference in signals from the plurality of sensors, the algorithm provides the randomizer with the new iteration of the second filter set and evaluates the difference in signals from the plurality of sensors before and after providing the randomizer with the new iteration of the second filter set, the algorithm repeating said narrowing or broadening process, and the algorithm converging on a parameter or range of parameters maximizing indications of deterrence in the threat.

20. A threat deterrence system comprising:
a plurality of sensors geographically spaced apart for monitoring threats and generating signals indicating at least a location of a threat;
a plurality of threat deterrence subsystems, at least one of which is located in a vicinity of each of said geographically spaced apart sensor locations;
at least one non lethal defensive element in each of said plurality of threat deterrence subsystems;
a controller configured to communicate a non lethal defensive element signal to individual ones of each of said plurality of threat deterrence subsystems based upon receipt of a threat signal from one or more of said plurality of sensors; and
an algorithm executing on said controller for generating the non lethal defensive element signal, the algorithm taking a random sample of one or more frequencies from within a frequency domain range, the algorithm taking a random sample of a time interval from within a time domain range, and the algorithm continuously generating and regenerating the non lethal defensive element signal at said random samples of time intervals with said random samples of one or more frequencies.

21. The threat deterrence system of claim 20, wherein the plurality of sensors generate image, sound, thermal, biometric, and other signals relating to the threat.

22. The threat deterrence system of claim 21, wherein the algorithm generates a non lethal defensive element signal, the algorithm accesses threat signals generated by the plurality of sensors, and the algorithm evaluates a difference in the threat signals before and after generating the non lethal defensive element signal.

23. The threat deterrence system of claim 22, wherein the algorithm narrows or broadens the time domain range and frequency domain range in response to a difference in threat signals from the plurality of sensors, the algorithm provides a new iteration of the non lethal defensive element signal and evaluates the difference in signals from the plurality of sensors before and after providing the new iteration of the non lethal defensive element signal, the algorithm repeating said narrowing or broadening process, and the algorithm converging on a parameter or range of parameters maximizing a psychological or physiological effect on the threat.

24. A sound deterrence system comprising:
a plurality of sensors geographically spaced apart for monitoring threats and generating signals indicating a location of a threat;
a housing containing the sound deterrence system located in a vicinity of one of said geographically spaced apart sensor locations;
a mid frequency sonic emitter arranged in said housing, said mid frequency sonic having a horn;
a waveguide disposed within said housing;
at least one high frequency sonic emitter arranged in said waveguide, said high frequency sonic emitter having a high frequency cone, the ratio of said high frequency cone area to said horn area being between 12 to 1 and 6 to 1;
a controller configured to communicate a driver signal to said high frequency sonic emitter and said mid frequency sonic emitter; and
an algorithm executing on said controller for generating the driver signal, the algorithm taking a random sample of one or more frequencies from within a frequency domain range, the algorithm taking a random sample of a time interval from within a time domain range, and the algorithm continuously generating and regenerating the driver signal at said random samples of time intervals with said random samples of one or more frequencies.

25. The sound deterrence system of claim 24, wherein the ratio of high frequency cone area to horn area is between 12 to 1 and 6 to 1.

* * * * *